(12) United States Patent
Frounfelker et al.

(10) Patent No.: US 7,739,831 B2
(45) Date of Patent: Jun. 22, 2010

(54) THERMAL ACTUATED PLANT PROTECTION DEVICE WITH INTERNAL AIR-FLOW CONTROL MECHANISM

(76) Inventors: Carl R. Frounfelker, 35619 Oak View Dr., Brownsville, OR (US) 97327; Marina A. Frounfelker, 35619 Oak View Dr., Brownsville, OR (US) 97327

( * ) Notice: Subject to any disclaimer, the term of this patent is extended or adjusted under 35 U.S.C. 154(b) by 1272 days.

(21) Appl. No.: 11/120,412

(22) Filed: May 2, 2005

(65) Prior Publication Data

US 2005/0241218 A1 Nov. 3, 2005

Related U.S. Application Data

(60) Provisional application No. 60/566,802, filed on Apr. 30, 2004.

(51) Int. Cl.
*A01G 13/02* (2006.01)
*A01G 9/24* (2006.01)

(52) U.S. Cl. .................... 47/29.5; 47/29.2; 47/19.2; 47/903

(58) Field of Classification Search .............. 47/19.1, 47/19.2, 22.1, 29.1, 29.2, 29.5, 30, 31.1, 47/2, 903
See application file for complete search history.

(56) References Cited

U.S. PATENT DOCUMENTS

| 3,946,521 | A | | 3/1976 | Ours | |
|---|---|---|---|---|---|
| 4,233,779 | A | * | 11/1980 | Griffith | 47/29.5 |
| 5,669,177 | A | * | 9/1997 | Frounfelker | 47/29.2 |
| 2002/0134010 | A1 | * | 9/2002 | Rohrborn et al. | 47/29.1 |

* cited by examiner

*Primary Examiner*—Trinh T. Nguyen
(74) *Attorney, Agent, or Firm*—Steven J. Adamson

(57) ABSTRACT

A plant protection device having a ventilation opening shield that may be protectedly positioned between a housing and a mounting socket. A temperature sensitive actuator may be provided in the socket and the shield may pivotally move about the socket between a position impeding airflow through the ventilation opening and a position facilitating airflow through the ventilation opening. Various embodiments and features are disclosed including a reinforced housing, multi-part housing construction, and a shield mounting structure provided through the shield, among other features.

18 Claims, 4 Drawing Sheets

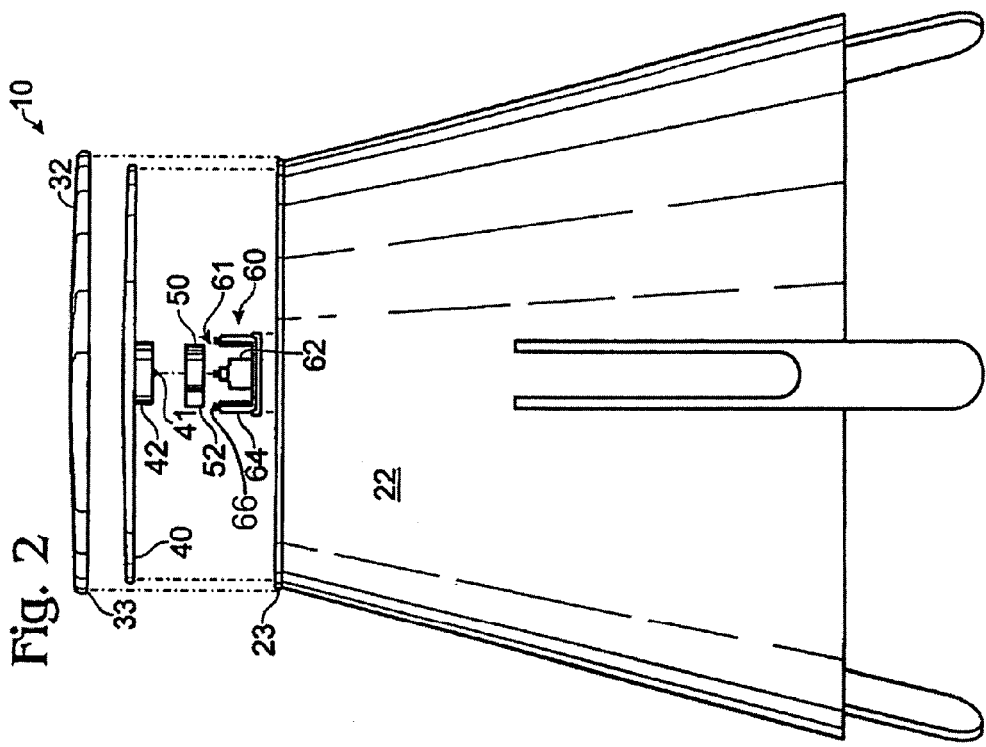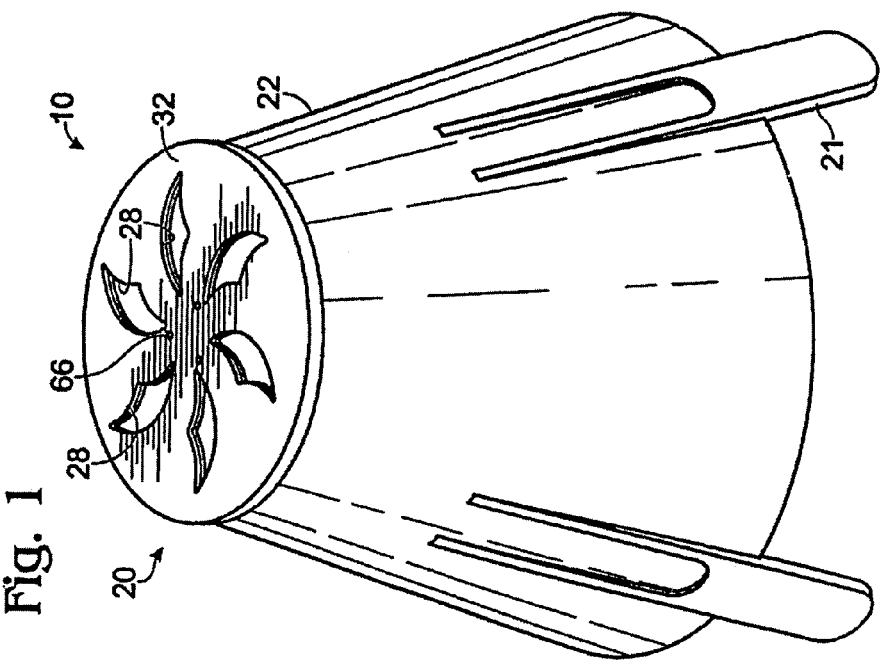

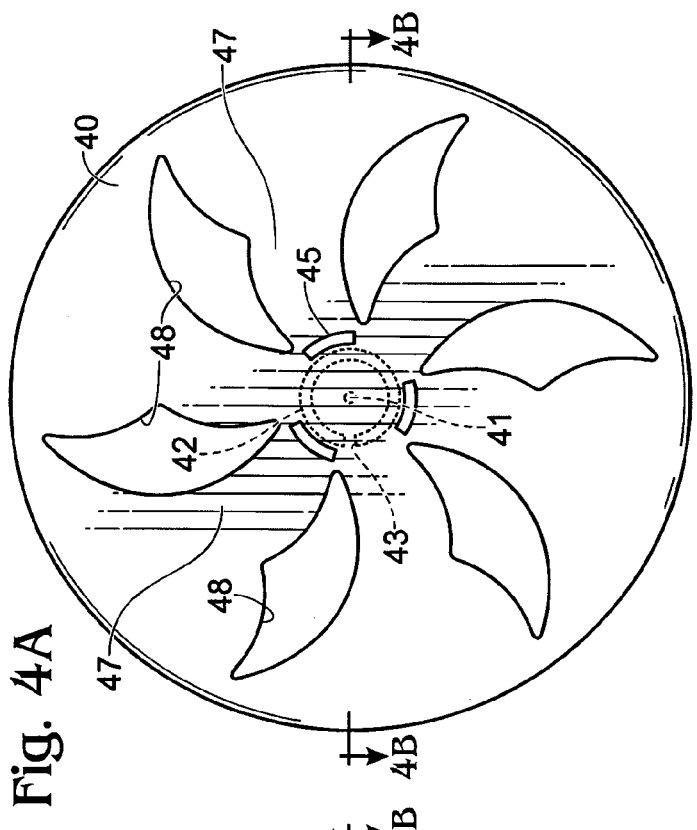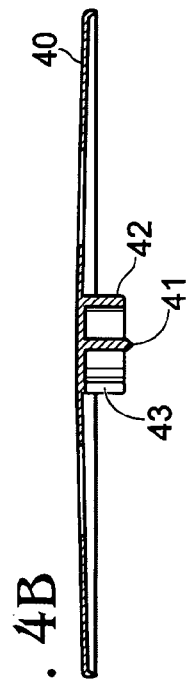
Fig. 4A
Fig. 4B
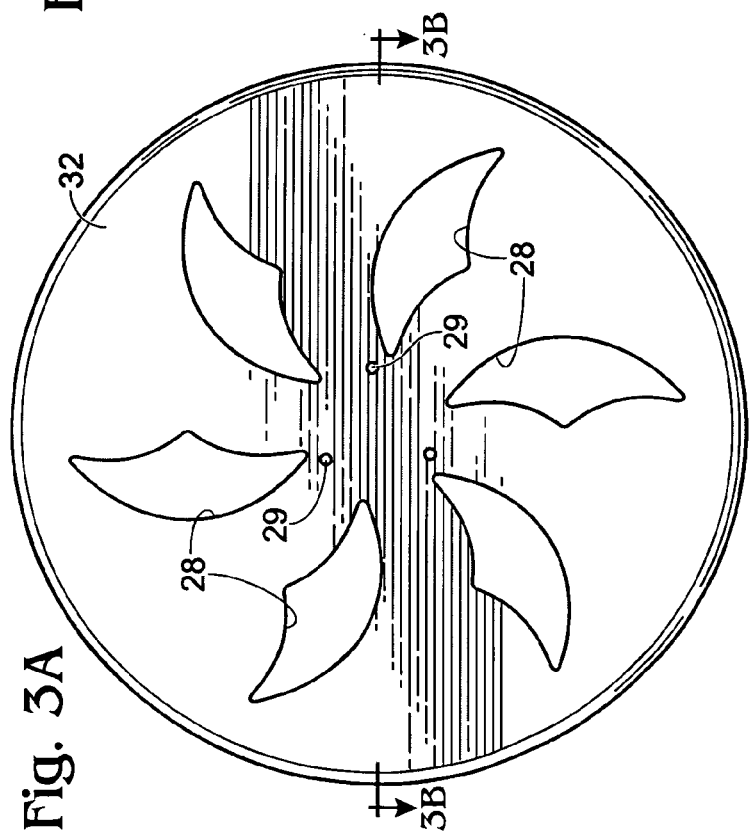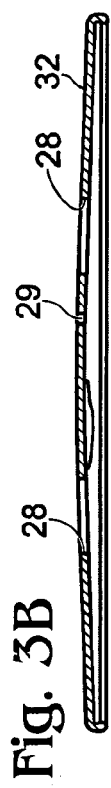
Fig. 3A
Fig. 3B

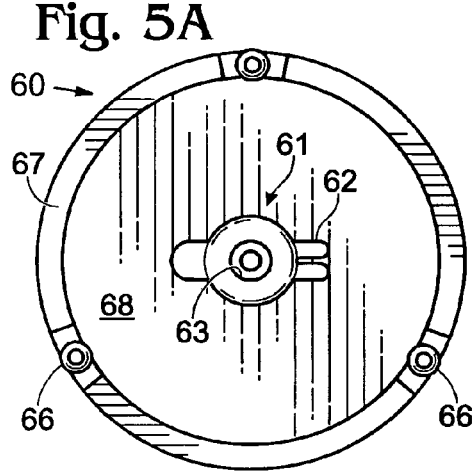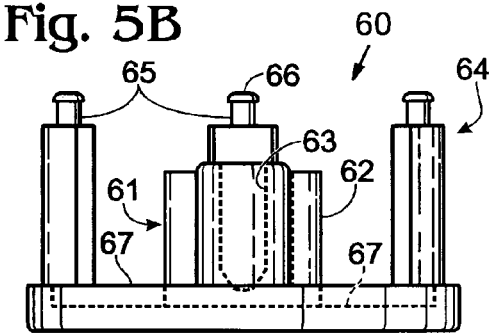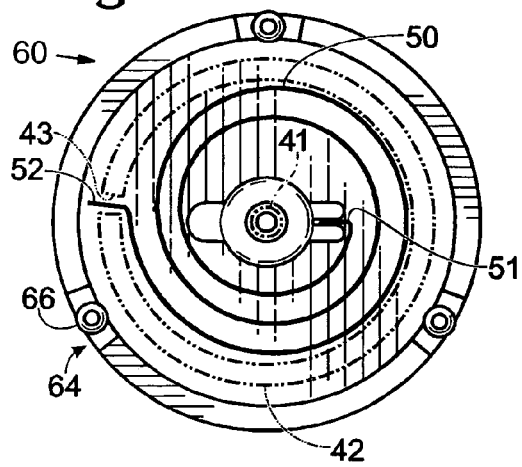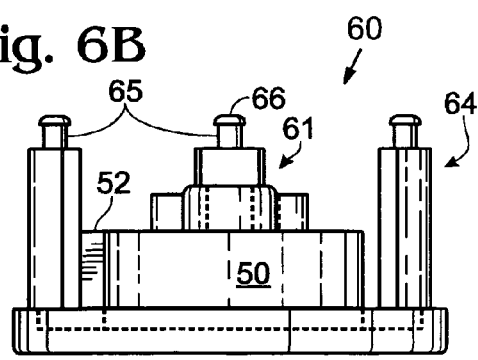

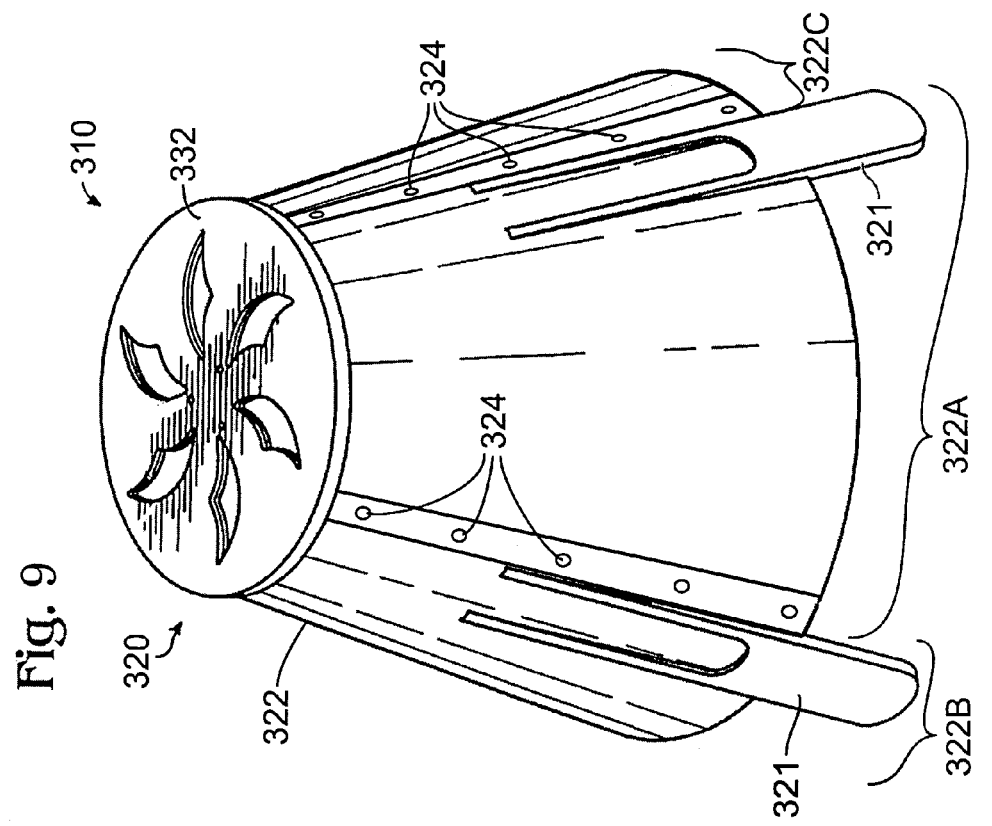
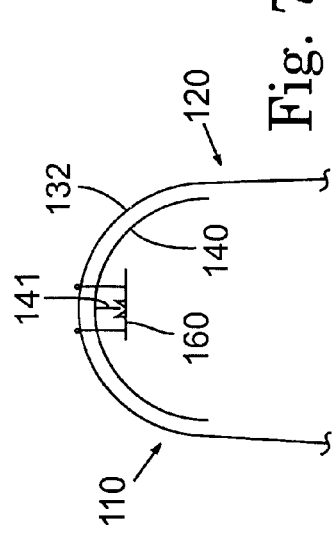
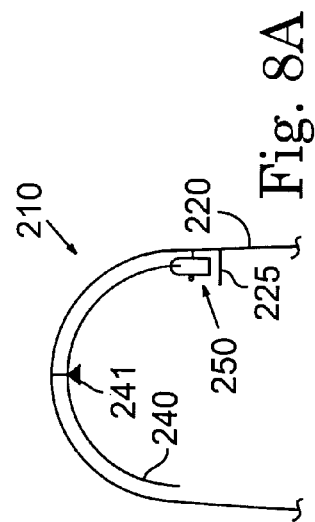
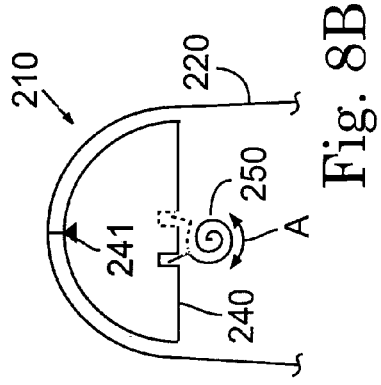

THERMAL ACTUATED PLANT PROTECTION DEVICE WITH INTERNAL AIR-FLOW CONTROL MECHANISM

This application claims the benefit of Provisional Application No. 60/566,802, filed Apr. 30, 2004, having the same title and inventor as above.

FIELD OF THE INVENTION

The present invention relates to devices that protect plants against frost yet also provide ventilation.

BACKGROUND OF THE INVENTION

Various devices for protecting plants against frost damage are known in the art. They include devices that cover plants to retain solar-thermal or geo-thermal energy and devices that generate heat, such as gas-fired heaters used in the citrus and other industries. Devices that collect or retain solar-thermal or geo-thermal energy include greenhouses, various framed structures with translucent covering, and smaller, portable translucent devices. The present invention relates primarily to the latter.

The prior art includes at least two portable plant protecting devices that are configured to provide frost protection, yet support ventilation as temperatures rise. One is U.S. Pat. No. 3,946,521, issued to Ours for a Ventilated Plant Protector. The other is U.S. Pat. No. 5,669,177 issued to Frounfelker (the inventor herein) for a Thermal Controlled Plant Protector. The '177 patent improved over the '521 patent, and the present invention improves over the '177 patent.

One disadvantageous aspect of the device of the '177 patent is that it may experience mechanical failure. The member that covers the ventilation openings is provided on the exterior of the housing. When handled roughly, this cover is readily dislodged or jammed or develops increased friction and no longer moves as desired. The exposed cover is also susceptible to fouling from environmental debris or other objects: leaves, twigs, dirt, insects, etc., that fall onto or otherwise become coupled to the cover. Furthermore, when stored in any position other than upright, the exposed cover may become dislodged or bent or otherwise impacted such that it fails to operate properly. The device of the '521 patent also has an exposed cover and suffers from the same or similar problems.

The device of the '177 patent (and that of the '521 patent) is also disadvantageous in that it is relatively difficult and expensive to manufacture. This is due primarily to the deep cavity design and the difficulty of forming such designs via injection molding techniques. In addition, the device of the '177 patent is disadvantageous in that the design may include stress points that are undesirably prone to failure, due either to insufficiently supported structures or angles or other structurally fragile aspects.

The device of the '177 patent (and that of the '521 patent) is further disadvantageous in that due to the externally disposed configuration of the airflow control shield there is a higher likelihood of damage and failure during stacking and storage.

A need exists for a thermal controlled plant protector that significantly reduces the incidence of mechanical failure, is durable when handled roughly, is resistant to failure from environmental debris/conditions and is readily stackable, at various angles, and with a high probability of functioning correctly after removal from the storage stack.

BRIEF DESCRIPTION OF THE DRAWINGS

FIG. 1 is a perspective view of a plant protecting device in accordance with the present invention.

FIG. 2 is an exploded side elevation view of the plant protecting device of FIG. 1.

FIGS. 3A-3B are a top plan view and a cross-sectional side view of the top section of the device of FIGS. 1-2.

FIGS. 4A-4B are a top plan view and a cross-sectional side view of the shield of the device of FIGS. 1-2.

FIGS. 5A-5B and 6A-6B are a top plan view and a side elevation view of the socket of the device of FIGS. 1-2 without and with an actuator respectively.

FIG. 7 is a side cross-sectional view of a plant protection device having a more pronounced dome-shaped housing in accordance with the present invention.

FIGS. 8A-8B are a side cross-sectional view and a side cut-away view of a plant protection device with an actuator mounted on the side of the housing in accordance with the present invention.

FIG. 9 is a perspective view of another embodiment of a plant protector device having multiple housing sub-parts in accordance with the present invention.

DETAILED DESCRIPTION

Referring to FIG. 1, a perspective view of a plant protecting device 10 in accordance with the present invention is shown. Device 10 includes a housing 20 that may be formed of a single piece, or as two separate sections 22,32, or otherwise. Housing 20 may have a plurality of ventilation openings 28, preferably but not necessarily, located towards the top thereof. As discussed in more detail below, a ventilation opening shield is provided internal to the housing and configured for movement between a position that permits air passage through the ventilation openings and a position that substantially impedes air passage through the ventilation openings. This shield may be held in a socket suspended from the top of housing 20 or otherwise supported. FIG. 1 illustrates the caps 66 of socket coupling arms that are mounted through complementary shaped mounting holes (shown in FIG. 3A) in housing 20.

Housing 20 may also include a plurality of anchor legs 21 that permit the anchoring of device 10 to the ground. This serves to steady the device against wind induced movement or being accidentally dislodged from its intended location, i.e., kicked, etc. The legs also permit a user to select how much ventilation is provided at the bottom of the device by judiciously selecting how far the legs are inserted into the growing medium.

Referring to FIG. 2, an exploded side elevation view of device 10 in accordance with the present invention is shown. FIG. 2 illustrates that housing 20 may be formed of separate bottom and top sections 22,32 that are coupled to one another. In one embodiment, among others, a lip 33 of top section 32 fits over a complementary rim 23 of bottom housing 22. This arrangement may be referred to as a snap-lock closure system or the like. Components 22,32 may be releasably attached or mounted with glue, heat joined or otherwise joined. While top section 32 is shown as being generally flat, it should be recognized that it may take any suitable shape including, but not limited to curved, domed, conical, etc. (see, for example, FIG. 7).

The embodiment of FIGS. 1-2 and the like provides structural reinforcement of housing 20 in the region of shield 40. In one aspect, the "flatter" shape of top section 32, and the presence of lip 33, provides lateral support to the housing (for example, to resist lateral compressive forces). In another aspect, the presence of rim 33 affords similar support.

It should also be recognized that while the ventilation openings are shown in the top section, they may be provided in the bottom section, for example, below yet proximate rim 23, or otherwise. If the openings are formed in the top of the bottom section, shield 40 (discussed below) is preferably formed to descend sufficiently to movably cover the openings.

FIG. 2 also illustrates internal shield 40, a temperature sensitive actuator 50 and socket 60. While shield 40 may be formed in various configurations, in the embodiment of FIG. 2, shield 40 has a central pivot 41 and a wall structure 42 that protects against fouling and other interference and provides a connection structure for actuator 50 (actuator engaging structure 43). Shield 40 also includes a plurality of passthrough openings 45 to accommodate the socket coupling arms 64, and a plurality of ventilation openings 48 that when aligned with ventilation openings 28 permit air passage (these features are shown in FIG. 4A).

The temperature sensitive actuator 50 may be a bi-metal coil or other suitable device. Bi-metal coils are known in the art. Coil 50 may include a first end or tab 51 (shown in FIG. 6A) that is coupled to socket 60 and a second end or tab 52 that is coupled to shield 40. The movement of coil 50 in response to temperature variations causes the first end 51 to move relative to the second end 52 which in turn causes the shield to move relative to the ventilation openings 28 (moving between an air blocking position and a non-air blocking position).

Socket 60 is formed to receive shield 40 and coil 50. Socket 60 includes a central cylindrical plug 61 that receives central pivot 41. A structure 62 for engaging the first end 51 of coil 50 may be formed integrally with plug 61 (see FIGS. 5 and 6) or otherwise arranged.

Coupling arms 64 of socket 60 are inserted through passthrough openings 45 (shown in FIG. 4A) in shield 40 until caps 66 are secured (by mechanical displacement or other means) into socket mounting openings 29 in housing 20. Socket 60 with shield 40 and coil 50 set therein may be mounted to top section 32, and top section 32 may then be mounted onto bottom section 22 to form device 10. Coil 50 is selected to operate over a given temperature range and movement range so as to maintaining shield 40 in a position blocking ventilation openings 28 at freezing and near-freezing temperatures and moving shield 40 to a non-blocking position as temperatures increase, and vice versa.

Referring to FIGS. 3A-3B, a top plan view and a cross-sectional side view of top section 32 are respectively shown. Referring to FIGS. 4A-4B, a top plan view and a cross-sectional view of shield 40 are respectively shown. FIGS. 3A-3B illustrate one arrangement of ventilation openings 28 and one arrangement of socket mounting openings 29 (it should be recognized that others ventilation opening shapes and arrangements may be used without departing from the present invention). FIGS. 4A-4B illustrate one arrangement of complementary ventilation openings 48 within shield 40 (and ventilation blocking structure 47 between ventilation openings 48). Pivot 41, cylindrical wall 42, coil engaging structure 43 (a slit in wall 42) and a plurality of coupling arm passthrough openings 45 are also shown.

While shield 40 may have ventilation openings 48 that resemble ventilation openings 28, the shape of openings 48 may vary widely (as may ventilation openings 28). The openings 48 are preferably provided in a pattern alternatingly with blocking structure 47 and complementary with the housing ventilation openings 28. The configuration of blocking structure 47 may vary widely, yet is preferably configured of sufficient dimensions to substantially impede airflow through ventilation openings 28 in cold weather.

Referring to FIGS. 5A-5B, a top plan view and a side elevation view of socket 60, without coil 50, are respectively shown. Referring to FIGS. 6A-6B, a top plan view and a side elevation view of socket 60, with coil 50, are respectively shown. Socket 60 includes plug 61 that includes coil engaging structure 62 and a central cavity 63 that receives shield pivot 41. Socket 60 also includes a base 68 bordered by a lip 67 out of which attachment arms 64 extend. The combination of wall 42 and lip 67 creates a substantially closed housing about coil 50 that impedes entry of dirt, insects and other debris or organisms that could reduce performance of the actuator and/or shield.

The first end 51 of coil 50 is preferably inserted into engaging structure 62 (as shown in FIG. 6A). Engaging structure 62 is preferably formed of a rigid, yet slightly elastic material such as plastic or the like such that end 51 is held in place by positive mechanical displacement of the engaging structure. The second end 52 of the coil is positioned to receive engaging structure 43 of shield 40. Note that the engaging structure 43 and wall 42 in which it is formed are shown in phantom lines in FIG. 6A. Pivot 41 is also shown in phantom lines as it would be situated in cavity 63. FIG. 6A illustrates the manner in which coil 50 is coupled to both shield 40 and housing 20 (through socket 60).

Socket coupling arms 64 each preferably include a tapered neck 65 and a tip or cap 66. One method of mounting socket 60 to housing 20 is pushing caps 66 through complementary openings 29 until neck 65 is lodged in openings 29. Other methods may be used.

It should be recognized that the present invention can be realized in several different embodiments that differ from those disclosed herein without deviating from the present invention. Examples include, but are not limited to, forming the housing as a single piece or as more than two pieces; using a different actuator; modifying the shape of the housing, the openings and/or the shield.

Referring to FIG. 7, a side cross-sectional view of a plant protection device 110 having a more dome-shaped housing 120 in accordance with the present invention is shown. FIG. 7 illustrates the top portion of plant protection device 120 (the remainder may be as in FIGS. 1-2). The top 132 of housing 120 may be dome or otherwise shaped and the shield 140 may be similarly contoured. Socket 160 and pivot 141 are also shown. Other components may be as discussed for device 10 above.

Referring to FIGS. 8A-8B, a side cross-sectional view and a side cut-away view of a plant protection device 210 with an actuator 250 mounted on the side rather than the top of the housing in accordance with the present invention are respectively shown. The shield 240 may still turn by a central pivot point 241 located at the top of the shield, though the actuator may be provided on the side or other location of the housing 220 and turn shield 240 as shown by arrow A. A protected member 225 may be provided under actuator 250 to protect the actuator and shield during stacking.

Referring to FIG. 9, a perspective view of another of a plant protector device 310 in accordance with the present invention is shown. In this embodiment, the housing is formed of several preferably identical housing sub-parts 322A-322C that are clipped (through tab and hole pairs 324) or otherwise joined together to assemble the finished bottom housing section 322. The top housing section 332 may then be mounted thereto to form device 310 as shown. Each sub-part may include (or start at) a leg 321 and extend ⅓ of the way around the housing to the next leg, where it is coupled to the next sub-part as shown. The three sub-parts may be formed from the same mold and assembled by an end-user, thereby permitting the plant protection device to be shipped in a significantly more compact form than as a single conical or cylindrical unit; the three housing pieces fitting within one another in a stream-lined package.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A plant protector device, comprising:
a housing having a plurality of ventilation openings located towards a top thereof;
a ventilation opening shield located within the housing that has surface area portions at least substantially as large as and positioned in a corresponding arrangement with the ventilation openings; and
a temperature-sensitive actuator provided within the housing and coupled to the shield for temperature based movement of the shield;
wherein the shield is moveable by the actuator between a first position in which the shield substantially impedes air flow through the ventilation openings and a second position in which the shield does not substantially impede air flow through the ventilation openings.

2. The device of claim 1, further comprising a socket extending inwardly from the housing and coupled thereto in a non-rotatable manner, wherein the actuator is located in the socket and is anchored at a first part to the socket and coupled at a second part to the ventilation opening shield.

3. The device of claim 2, wherein the socket descends substantially vertically from the top of the housing and the actuator is seated in the socket such that it is protected from below by the socket and from above by the housing.

4. The device of claim 3, wherein the socket and the actuator are substantially horizontally disposed.

5. The device of claim 1, wherein the housing includes a top housing part and a body housing part that are coupled to one another.

6. The device of claim 5, wherein the top housing part provides reinforcement to the body housing part where the top housing part couples to the body housing part.

7. The device of claim 1, wherein said housing has a circular horizontal cross-sectional shape proximate the bottom of the shield and is configured to resist horizontal compressive forces by at least one of a circumferential rim proximate the bottom of the shield and a top portion that is substantially horizontal.

8. The device of claim 2, further comprising a side wall structure provided about said actuator.

9. The device of claim 2, wherein the socket is coupled through the shield to the housing in a non-rotatable manner.

10. The device of claim 1, wherein the actuator is a bi-metal coil.

11. The device of claim 1, wherein the housing includes a plurality of physically separate substantially identical sub-parts that are coupled together to at least in part form the housing.

12. A plant protection device, comprising:
a housing having a plurality of ventilation openings;
a ventilation opening shield located within the housing, the shield being moveably coupled to the housing for movement between a first position in which the shield substantially impedes air flow through the ventilation openings and a second position in which the shield does not substantially impede air flow through the ventilation openings;
a temperature-sensitive actuator provided within the housing and coupled to the shield for temperature based movement of the shield; and
a socket extending inwardly from the housing and coupled thereto in a non-rotatable manner, wherein the actuator is located in the socket and is anchored at a first part to the socket and coupled at a second part to the ventilation opening shield;
wherein the actuator is seated in the socket such that the socket forms an interiorly disposed physical barrier to the actuator and the housing forms an exteriorly disposed physical barrier to the actuator; and
wherein the housing is configured to resist horizontal compressive forces proximate the outer edge of the shield by at least one of a reinforced rim proximate the outer edge of the shield and a top portion that is characterized as being substantially non-domed in shape.

13. The device of claim 12, wherein the shield has substantially the same contour as the portion of the housing adjacent the shield.

14. The device of claim 12, wherein a given point on the shield moves substantially within the same horizontal plane as the shield moves between the first and second positions.

15. The device of claim 12, wherein the socket is detachably coupled to the housing.

16. The device of claim 12, wherein the top portion of the housing that is characterized as being non-domed is further characterized as being substantially horizontally disposed.

17. The device of claim 1, wherein the housing includes a plurality of physically separate substantially identical sub parts that are coupled together to at least in part form the housing.

18. The device of claim 12, wherein the actuator is a bi-metal member.

* * * * *